United States Patent
Kardas et al.

(10) Patent No.: US 9,604,703 B2
(45) Date of Patent: Mar. 28, 2017

(54) RAIL MOUNTING SYSTEM

(71) Applicant: Hobie Cat Company, Oceanside, CA (US)

(72) Inventors: Jason Christopher Kardas, Vista, CA (US); Gregory Scott Ketterman, Oceanside, CA (US); Philip James Dow, Oceanside, CA (US); James Taylor Czarnowski, Fallbrook, CA (US); Drew William Brackett, Oceanside, CA (US)

(73) Assignee: Hobie Cat Company, Oceanside, CA (US)

( * ) Notice: Subject to any disclaimer, the term of this patent is extended or adjusted under 35 U.S.C. 154(b) by 0 days.

(21) Appl. No.: 14/732,520

(22) Filed: Jun. 5, 2015

(65) Prior Publication Data

US 2016/0001851 A1    Jan. 7, 2016

Related U.S. Application Data

(60) Provisional application No. 62/020,045, filed on Jul. 2, 2014.

(51) Int. Cl.
| | |
|---|---|
| *B63B 17/00* | (2006.01) |
| *B63B 17/04* | (2006.01) |
| *B63B 25/00* | (2006.01) |
| *A01K 97/10* | (2006.01) |

(52) U.S. Cl.
CPC .............. *B63B 17/04* (2013.01); *A01K 97/10* (2013.01); *B63B 25/002* (2013.01)

(58) Field of Classification Search
CPC ..... B63B 17/00; B63B 17/04; B63B 2017/04; B63B 25/002; A01K 97/10
USPC ................................... 114/343, 364
See application file for complete search history.

(56) References Cited

U.S. PATENT DOCUMENTS

| | | | | |
|---|---|---|---|---|
| 3,484,066 | A * | 12/1969 | Aunspaugh | A01K 97/10 248/229.22 |
| 3,903,634 | A * | 9/1975 | Miyamae | A01K 97/10 43/21.2 |
| 4,852,291 | A * | 8/1989 | Mengo | A01K 97/10 248/230.3 |
| 5,007,612 | A * | 4/1991 | Manfre | A01K 97/00 220/DIG. 9 |
| 7,434,775 | B2 * | 10/2008 | Wilcox | B63B 25/002 248/228.1 |
| 7,500,451 | B2 * | 3/2009 | Ingraham | A01M 29/32 114/343 |
| 7,841,124 | B2 | 11/2010 | Wegman | |
| 8,453,373 | B2 * | 6/2013 | Gordon | A01K 97/10 248/534 |
| 2006/0137497 | A1 * | 6/2006 | Whiteford | B25B 7/00 81/357 |

* cited by examiner

*Primary Examiner* — Daniel V Venne
(74) *Attorney, Agent, or Firm* — Joseph E. Meuth, Esq.

(57) ABSTRACT

The invention relates to a watercraft mounting system that embodies a multi-faceted tube and a mating clamp system adapted to carry an accessory. The designs of the railing and clamp have geometry to prevent rotation while allowing flexibility of adjustment in multiple positions.

14 Claims, 8 Drawing Sheets

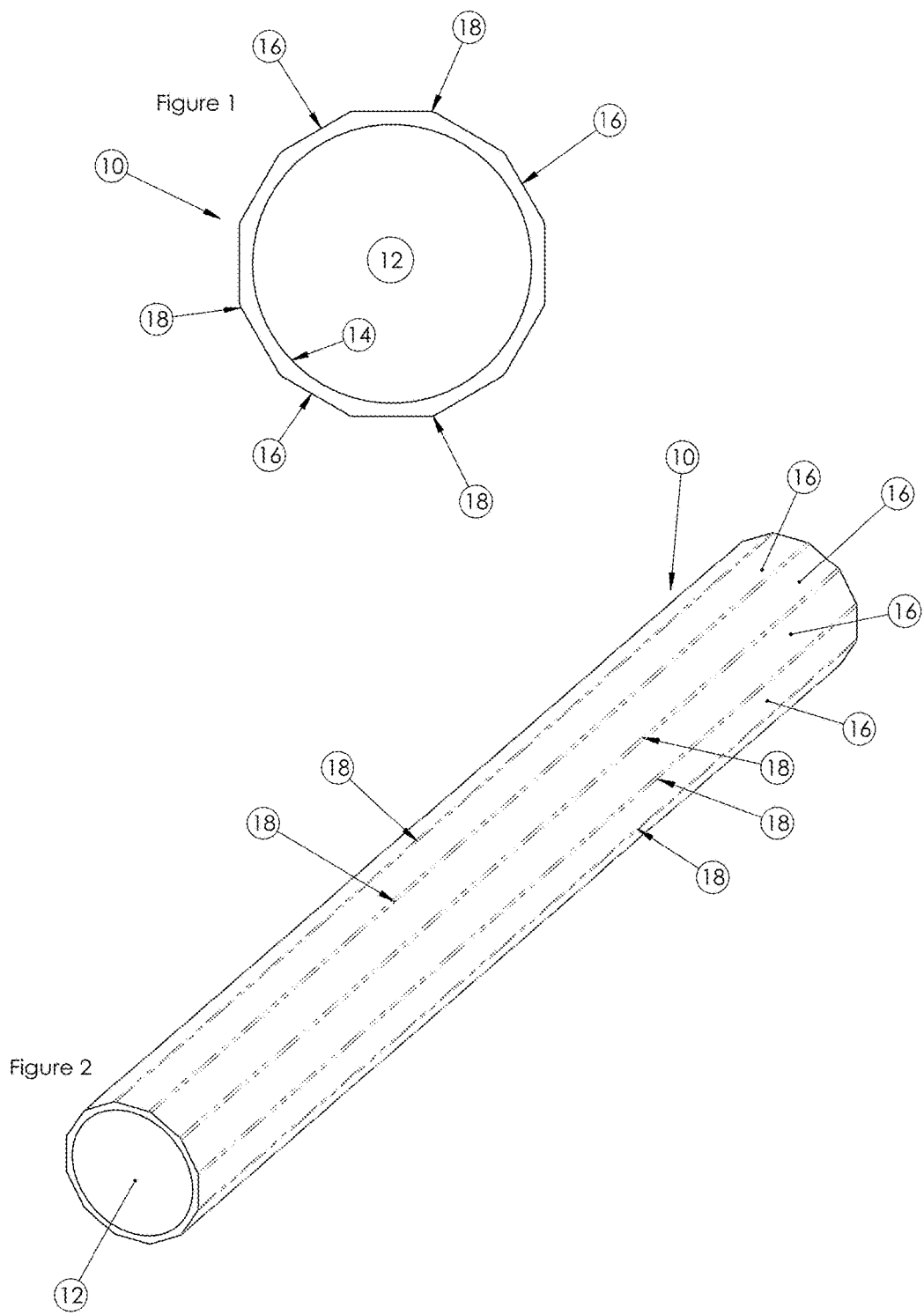

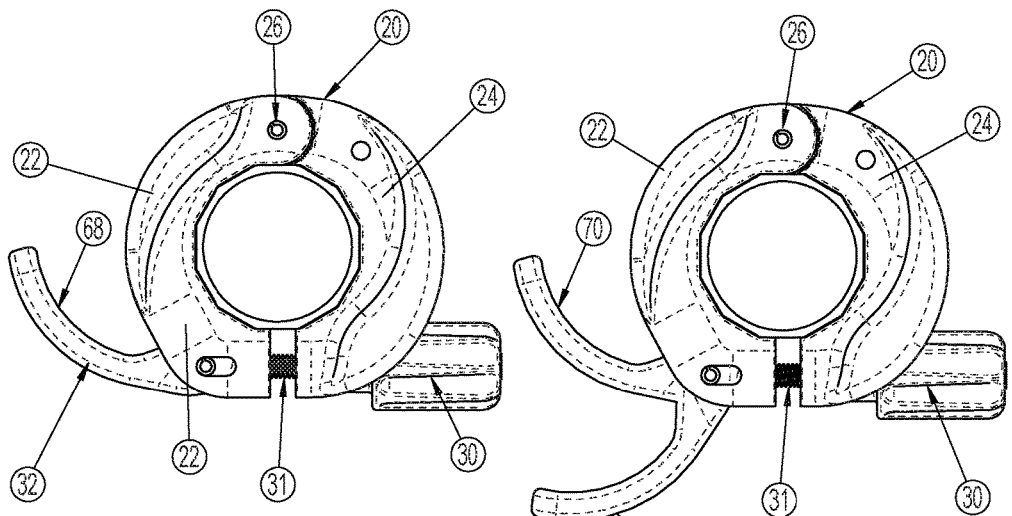
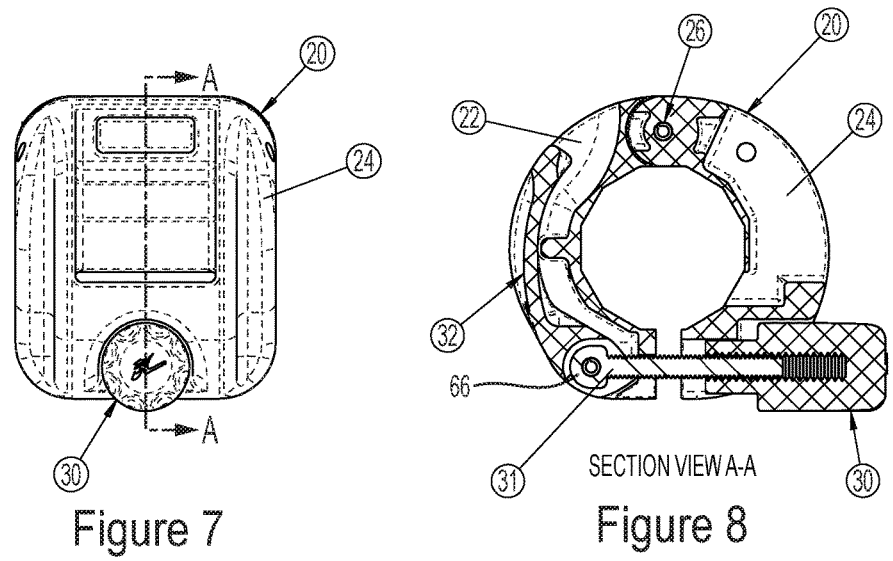

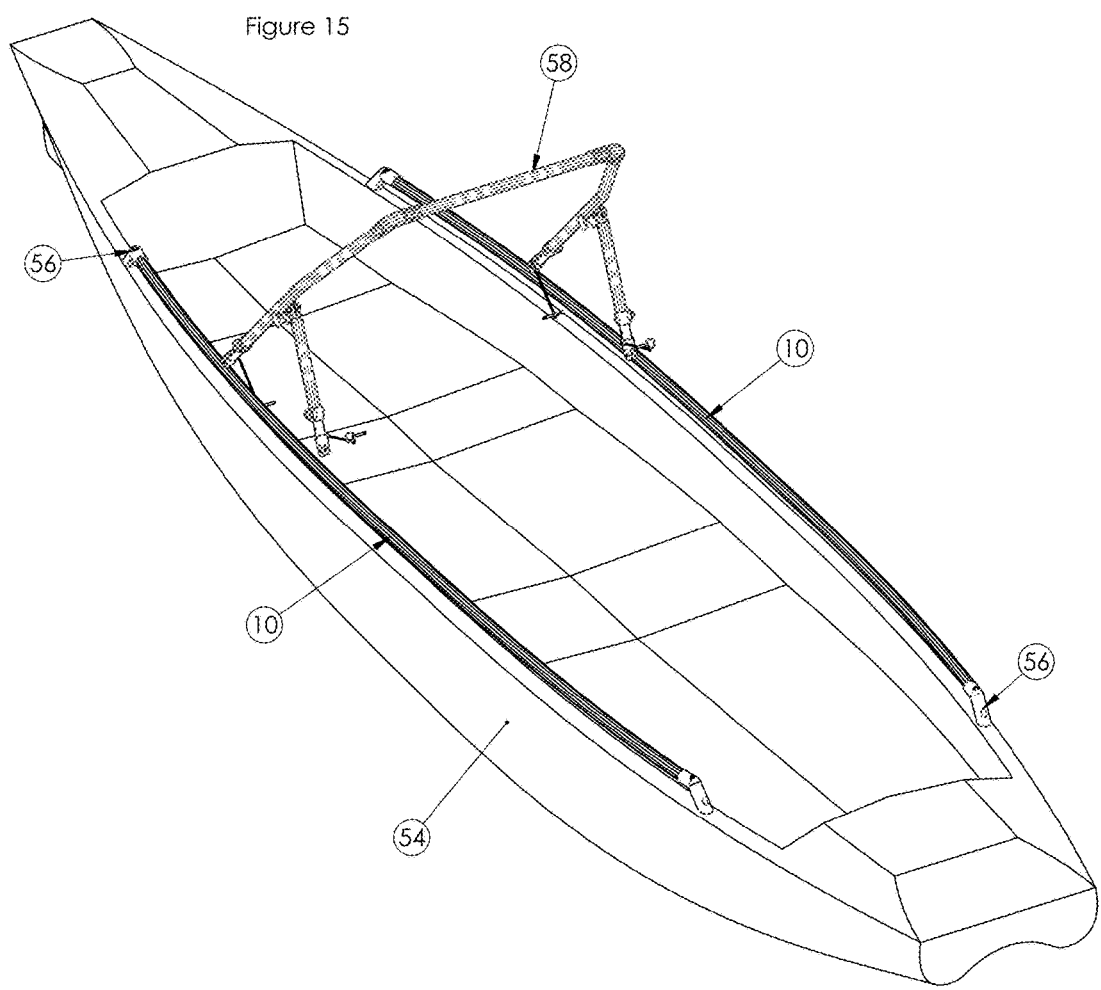

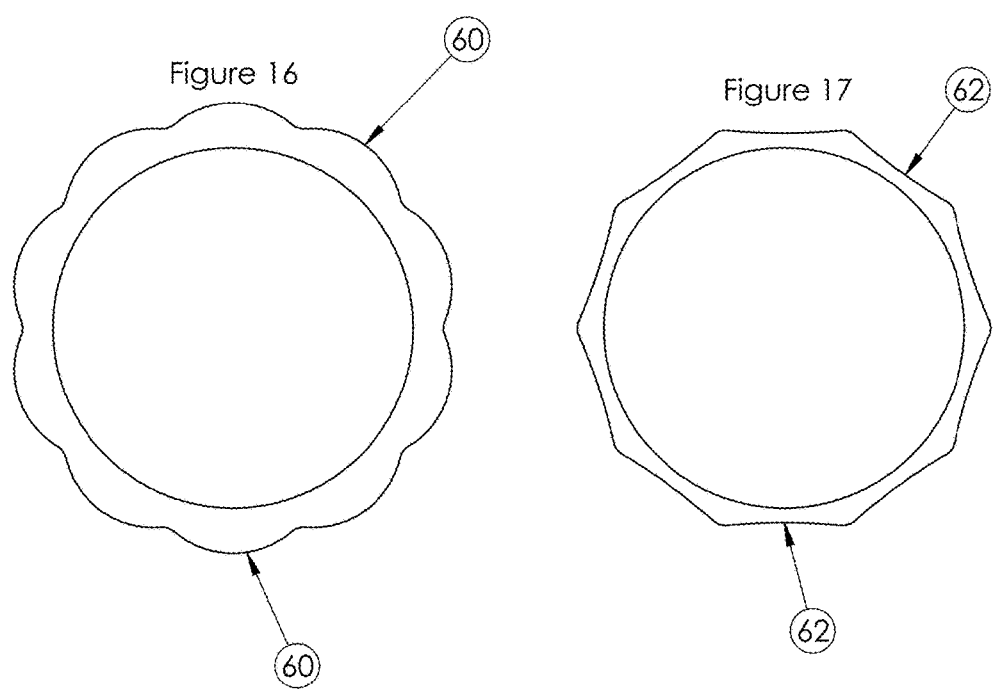

RAIL MOUNTING SYSTEM

Applicant claims the benefit of U.S. Provisional Patent Application Ser. No. 62/020,045, filed Jul. 2, 2014.

FIELD OF INVENTION

This invention relates to systems for carrying or mounting accessories on watercraft.

BACKGROUND OF INVENTION

It is known to have side or transverse rails on watercraft such as canoes, kayaks, sailboats, powerboats and the like to which are mounted various common accessories, viz., fishing rod holders, cup holders, tackle or bait boxes, and the like. The side rails typically run fore to aft adjacent the cockpit and usually beyond for a substantial length of the watercraft. The rails serve as handles and take the form of hollow metal tubes which are generally cylindrical although the tubes can be solid and made of steel or any other suitable material.

Mengo, U.S. Pat. No. 4,852,291 shows a fishing rod holder system for adapting a fishing rod holder to a round or four-sided square side rail. The patent does not address the adjustment of the position of the fishing rod holder with reference to the rail and any such adjustment is severely limited by the four-sided feature of the rail. The system of this patent uses two opposed separate plates connected by bolts with the rail sandwiched between the opposed plates. One of the plates carries the rod holder.

Wilcox, U.S. Pat. No. 7,434,775 B2 discloses a bracket assembly for holding accessories on a boat rail. The bracket includes mounting plates which are held on the boat rail by bolts and wing nuts. The orientation of the assembled bracket including accessories with respect to the boat rail is not adjustable about the rail.

Wegman, U.S. Pat. No. 7,841,124 B2 discloses a fishing rod holder mounted on a tube or rail of a watercraft having a plate which is bolted to a cap to secure the holder to the tube or rail. The plate and cap have mounting channels therein which provide for two positions of the fishing rod holder to the rail.

SUMMARY OF THE INVENTION

The combination comprising a tubular handrail on a watercraft having more than four essentially identical surfaces each extending along the longitudinal dimension to form the exterior surface of the tubular handrail and a clamping system having interior surfaces for extending around said tubular handrail such that said surfaces prevent rotation of the clamping system about the rail when the clamping system is closed and provide incremental adjustability of the orientation of the clamping system about said tubular handrail.

A watercraft comprising the combination comprising a tubular handrail on a watercraft having more than four essentially identical surfaces each extending along the longitudinal dimension to form the exterior surface of the tubular handrail and a clamping system having interior surfaces for extending around said tubular handrail such that said surfaces prevent rotation of the clamping system about the rail when the clamping system is closed and provide incremental adjustability of the orientation of the clamping system about said tubular handrail.

There are two features which are part of this invention:
1) Multi-faceted tube that serves as a handle and mounting rail
2) Clamping system that mounts to the multi-faceted tube and is provided with means for holding accessories.

Tube with Mechanical Interference Features

The foundation of the invention is a tube-like handrail structure with a multi-faceted profile in the form of essentially identical surfaces each of which extend along the lengthwise or longitudinal dimension of the tube. The edges of each surface or facet abut the edge of the adjacent facets. The edges are all parallel to the longitudinal center line of the handrail tube. The exterior surface of this tube is such that the tube has a closed profile comprised of more than four identical surfaces. These identical surfaces or facets provide a mechanical feature to prevent rotation of items clamped to the tube. The facets also allow for a series of adjustments around the tube at angles that correspond to the number of facets on the tube. The number of facets may vary from five to twelve or more. The identical surfaces are preferably flat. However, the identical surfaces can be slightly concave or convex.

Clamping System

The clamping system has a profile which interlocks with the multi-faceted tubular handrail structure to provide mechanical interference and prevent rotation. The design of the clamp system is such that it has two halves that form and close tightly around the tube structure and are clamped together via a clamping means. The interior surface of the clamp has surfaces which when the clamping system is closed about the tube structure engage with facets on the tubular handrail.

THE DRAWINGS

In the drawings:

FIG. 1 is a sectional view of the multifaceted tubular handrail of this invention.

FIG. 2 is a perspective view of the exterior and one open end of a preferred multifaceted tubular handrail of this invention.

FIG. 5 shows the clamp loosened to slide along the tubular handrail.

FIG. 6 shows the clamp as it is manipulated to begin to open up to release from the handrail.

FIG. 7 is a plan view taken from the right side in FIG. 5.

FIG. 8 is a sectional view taken along the line A-A in FIG. 7.

FIG. 15 shows a typical watercraft which is additionally equipped with a transverse handrail according to this invention.

FIG. 16 is a sectional view showing the identical surfaces on the handrail having a slightly convex shape.

FIG. 17 is a sectional view showing the identical surfaces of the handrail having a concave shape.

DESCRIPTION OF THE PREFERRED EMBODIMENTS

Figure 3:
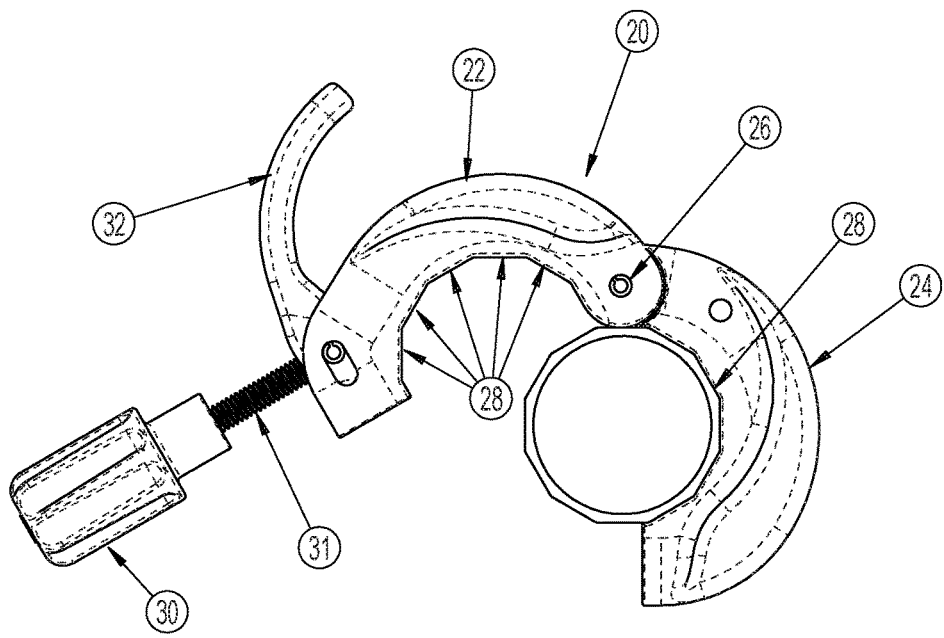
FIG. 3 is a plan view of the preferred clamp of this invention in the open position disposed about the handrail.

Turning to the drawings in further detail:

FIG. 1 discloses a tubular member 10 which serves as the handrail on a watercraft. The tubular member 10 has a hollow interior 12 and a cylindrical interior surface 14. The exterior surface has a plurality of essentially identical surfaces or facets 16.

In the embodiment shown in FIGS. 1 and 2, the tubular member has 12 facets, each of which is disposed 30° from the adjacent facets. The edges 18 of each facet 16 abut the edges of the adjacent facets and each facet runs the length of tubular member 10. The edges 18 are all parallel to the longitudinal center line of tubular member 10.

A preferred embodiment of the clamping system, generally 20, is shown in FIGS. 3 to 8.

In this embodiment, the clamp comprises two arcuate elements 22 and 24 joined by hinge 26. The inner surfaces of the arcuate elements 22 and 24 have a series of flat surfaces or facets 28 which abut the flat facets 16 on the tubular member 10 so that when the clamp is closed, the clamp cannot rotate about the tubular member. The combined inner surfaces of the arcuate elements 22 and 24 typically have the same number of facets as the tubular member 10. As shown in FIG. 3, each arcuate member has seven facets which is sufficient to provide a wide range of adjustability about the tubular member 10 and also provide secure locking. The arcuate members 22 and 24 may have, for example, four facets each for a tubular member having ten facets or six facets each for a tube having fourteen facets. Many such variations are possible.

Figure 4:
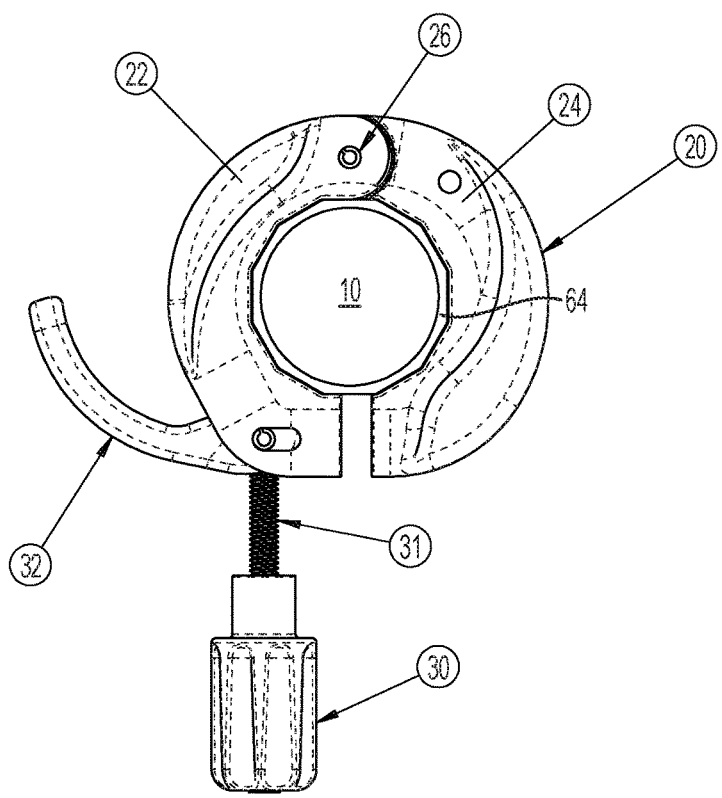
FIG. 4 shows the clamp and handrail of FIG. 3 as the clamp is closed but not locked onto the handrail.

FIGS. 3 and 4 display how the clamping system attaches and interfaces with the multi-faceted tubular member 10. This particular clamping system is hinged at the top, but could also be two separate pieces and clamped together accordingly.

FIGS. 5 and 6 display how the clamping system 20 tightens down onto the tubular member 10. This particular embodiment uses a latch system with an adjustable tension knob 30, threaded eye bolt 31, and a locking lever 32 to lock the system into the clamped position. The threaded eye bolt 31 attaches to the locking lever 32 and can be swung open when the cam 66 and/or knob is loose to allow the clamping system to be removed from the tubular member. In FIG. 5 the locking lever 32 is loosened so that the clamping system can be slid along the tubular member 10. In FIG. 6, the locking lever 32 is in a position that the clamping system is more open and allows the clamp to rotate around the tubular member 10.

FIGS. 7 and 8 illustrate cutaway views of the clamp system.

Figures 9, 10:
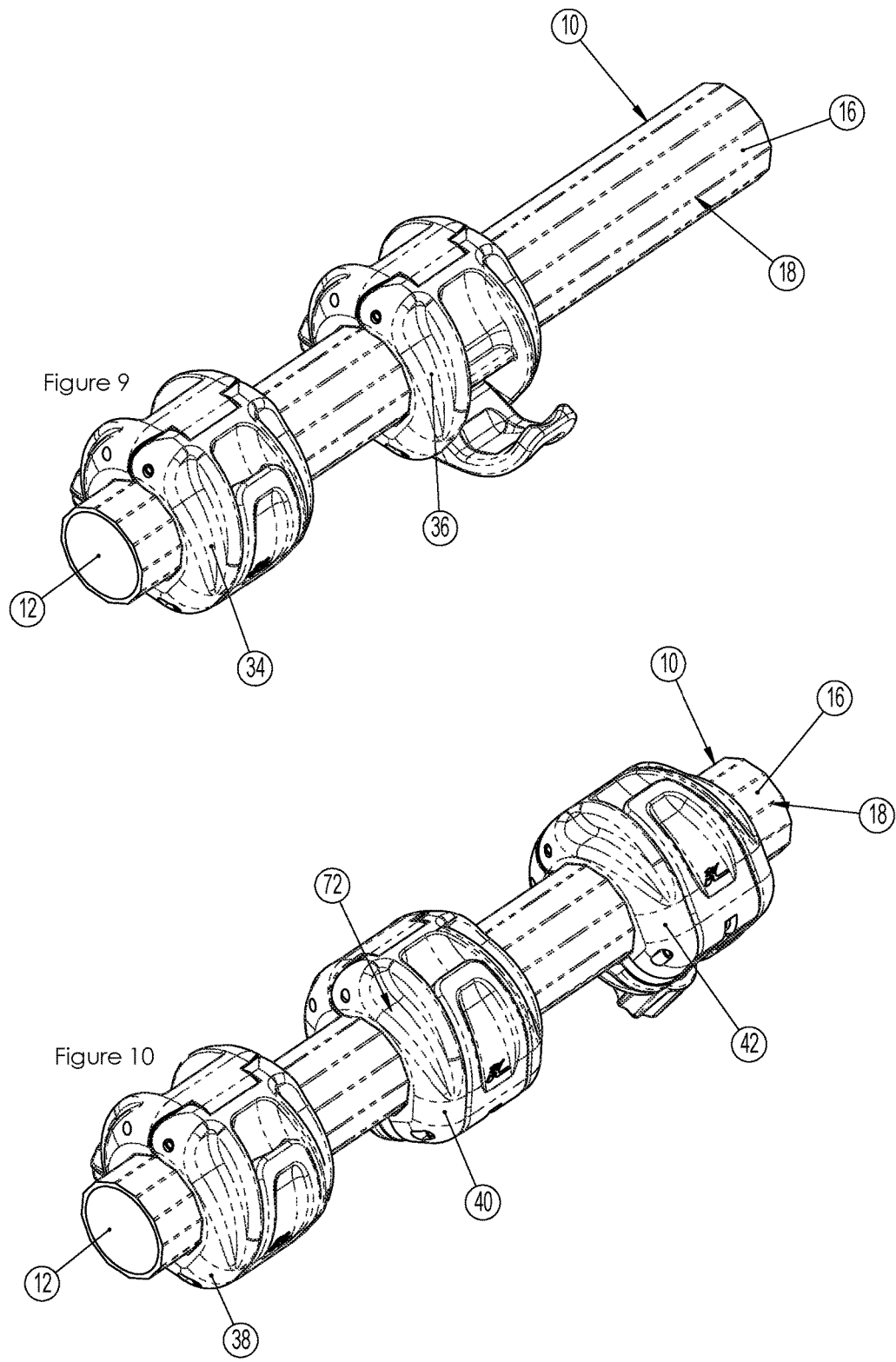
FIG. 9 shows two clamps fully clamped onto the handrail of the rail of FIGS. 1 and 2.
FIG. 10 shows three clamps on the handrail locked onto the handrail 30° apart with respect to each other.

FIG. 9 illustrates how the clamping system can be adjusted along the tubular member 10 when loose. Clamp 34 when in the locked position cannot be moved. Clamp 36 can be unlocked and slid along the length of the tubular member 10.

FIG. 10 illustrates how the clamping system can be rotated incrementally around the tubular member 10 to different angles which are determined by the number of flat angles on the tubular member. Clamp 38 is positioned at 0° while clamp 40 is locked in at 30° and clamp 42 at 60°.

Figure 11:
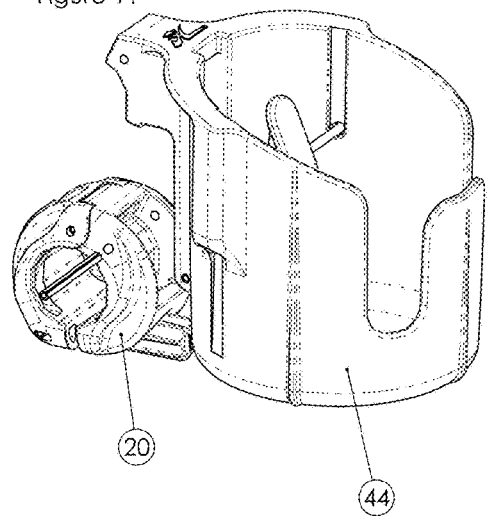
FIG. 11 shows the clamp of FIGS. 3 to 10 with a cup holder accessory attached.
Figure 12:
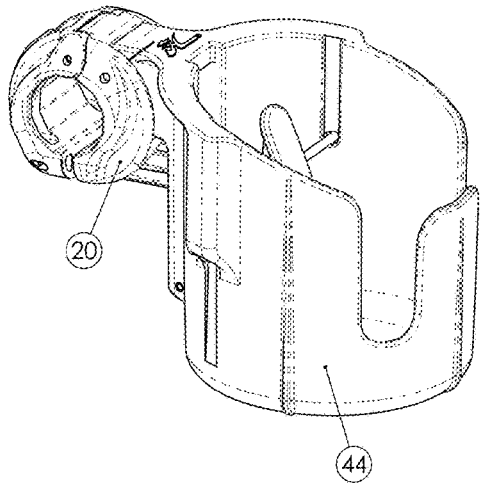
FIG. 12 is similar to FIG. 11 with the clamp being attached to the upper or open end of the cup holder.

FIGS. 11 and 12 illustrate the clamp system provided with an accessory (cup holder 44 in this illustration). The cup holder 44 can be attached to the clamping system by a variety of means including bolts, rivets or by plastic heat welding.

Figure 13:
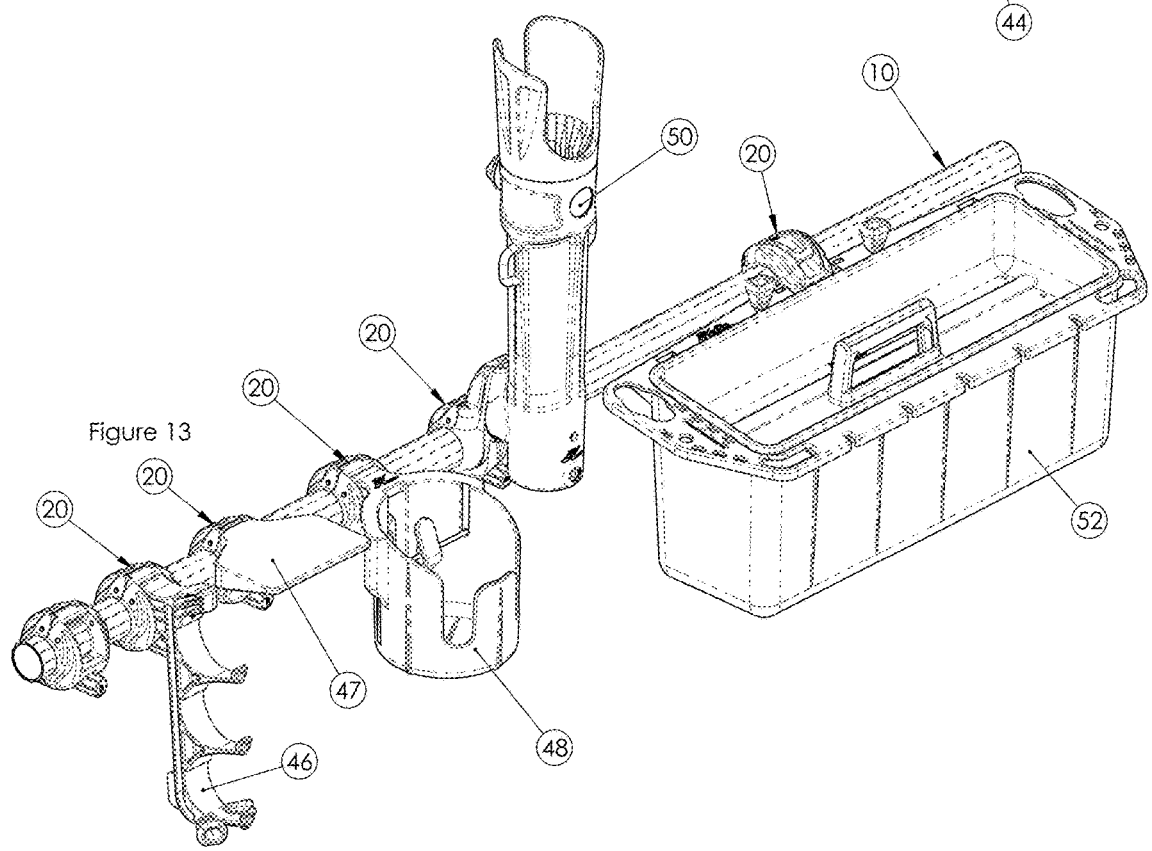
FIG. 13 shows a variety of accessories attached to the handrail of this invention.

FIG. 13 illustrates a variety of accessories 46, 47, 48, 50 and 52 mounted to the tubular member 10.

Figure 14:
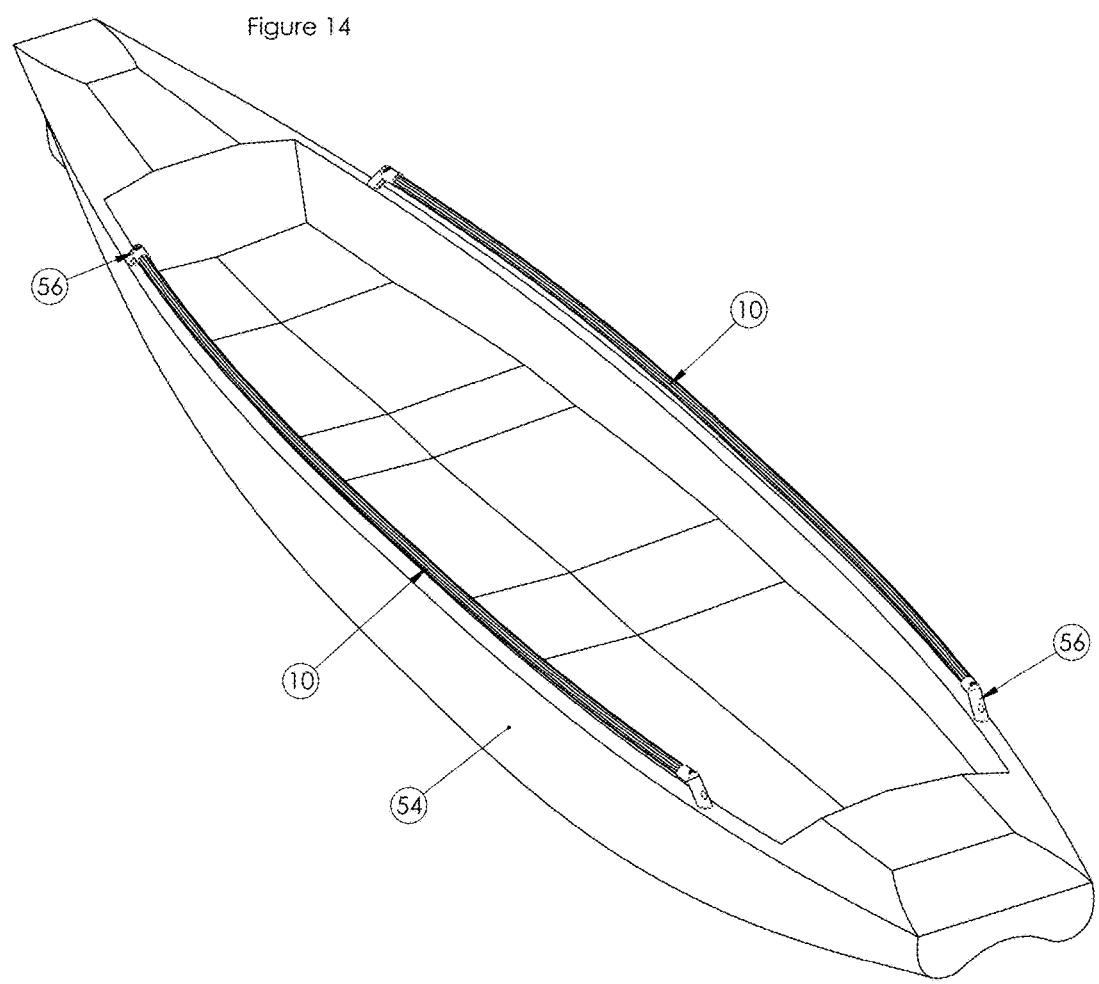
FIG. 14 shows typical watercraft equipped with the handrail of this invention.

FIG. 14 illustrates tubular members 10 attached to a watercraft 54 and carried by a series of spaced apart uprights 56.

The tubular members run along the sides of the watercraft and are adapted to receive the clamping system described above. The tubular member may also or alternatively run transversely across the longitudinal dimension of the hull of the watercraft, normally in proximity to the seating area or the cockpit, as shown at 58 in FIG. 15.

The clamping system 20 has two arcuate members 22 and 24 adapted to be joined together to form a central opening 64. A series of flat surfaces 28 are disposed about the interior of the central opening which can be brought into engagement with at least some of the flat surfaces on the tubular handrail 10. The two arcuate members are joined by a hinge 26. The clamping system has a locking lever 32 which provides multistage locking where in one position 68 the clamping system is loose enough to slide along the tubular handrail, a second position 70 which allows the clamping system to rotate around the tubular handrail, and a third position 72 where the clamping system is secured to the tubular handrail.

The identical surfaces need not be flat. The identical surfaces can also be convex in shape, 60, as shown in FIG. 16, or concave, 62, as shown in FIG. 17.

In operation, the clamping system carrying an accessory 44, 46, 47, 48, 50 and/or 52 can be easily adjusted along the length of the tubular member 10 or rotated incrementally about the tubular member 10. By first lifting up on the tension knob 30 and then pulling out on locking lever 32, the clamp system is loosened and can be rotated about tubular member 10. In the case where the tubular member 10 has twelve facets the clamp can be rotated and/or slid along tubular member 10, and then in 30° increments, locked into place by pushing the locking lever 32 into its locked position. This provides adjustment of the orientation of any accessory around the tubular member 10 as well its position along the length of the tubular member 10.

The invention claimed is:

1. A combination comprising a tubular handrail on a watercraft and a clamping system;

said tubular handrail having more than four identical exterior surfaces extending a length of said tubular handrail and having edges parallel to the longitudinal center line of said tubular handrail, said edges abutting the edges of said identical exterior surfaces;

and said clamping system extending around said tubular handrail and comprising two arcuate elements joined by a hinge and having multistage locking providing three positions whereby when in a first position said clamping system is loose enough to slide along said tubular handrail, a second position for allowing said clamping system to be rotated incrementally around said tubular handrail to different angles, and a third position where said clamping system is closed and locked to said tubular handrail, said arcuate elements having a plurality of interior surfaces engaging said exterior surfaces on said tubular handrail such that said engaging surfaces prevent rotation of said clamping system about said handrail, when said clamping system is closed.

2. A watercraft comprising the combination comprising a tubular handrail and a clamping system;

said tubular handrail having more than four identical exterior surfaces extending a length of said tubular handrail and having edges parallel to the longitudinal center line of said tubular handrail, said edges abutting the edges of said identical exterior surfaces;

and said clamping system extending around said tubular handrail and comprising two arcuate elements joined by a hinge and having multistage locking providing three positions whereby when in a first position said clamping system is loose enough to slide along said tubular handrail, a second position for allowing said clamping system to be rotated incrementally around said tubular handrail to different angles, and a third position where said clamping system is closed and locked to said tubular handrail, said arcuate elements having a plurality of interior surfaces engaging said exterior surfaces on said tubular handrail such that said engaging surfaces prevent rotation of said clamping system about said handrail, wherein said clamping system further comprises an adjustment knob which allows for varying the clamping pressure on said tubular handrail.

3. The watercraft of claim 2 wherein said tubular handrail runs along the sides of said watercraft.

4. The watercraft of claim 2 wherein said tubular handrail runs transversely across the longitudinal dimension of the hull of said watercraft.

5. The watercraft of claim 2 wherein said exterior surfaces of said tubular handrail are flat.

6. The watercraft of claim 2 wherein said exterior surfaces of said tubular handrail are concave.

7. The watercraft of claim 2 wherein said exterior surfaces of tubular handrail are convex.

8. The watercraft of claim 2 wherein said interior surfaces of said clamping system and said exterior surfaces of said handrail are flat.

9. The watercraft of claim 2 wherein said clamping system carries a holder for carrying an accessory.

10. The watercraft of claim 2 wherein said accessory is a fishing rod holder.

11. The watercraft of claim 2 wherein said accessory is a cup holder.

12. The watercraft of claim 2 wherein said accessory is a bait or tackle box.

13. The watercraft of claim 2 wherein said accessory is a flat mounting surface.

14. The watercraft of claim 2 wherein said tubular handrail has twelve identical exterior surfaces and said clamping system has ten interior surfaces.

* * * * *